United States Patent [19]

Sugita et al.

[11] 4,048,409

[45] * Sept. 13, 1977

[54] ARTICLE MADE OF PROPYLENE-ETHYLENE COPOLYMER

[75] Inventors: Yasunori Sugita, Tokyo; Yasuhiko Itagaki, Yokohama, both of Japan

[73] Assignee: Mitsui Toatsu Chemicals, Incorporated, Tokyo, Japan

[*] Notice: The portion of the term of this patent subsequent to Mar. 16, 1993, has been disclaimed.

[21] Appl. No.: 666,265

[22] Filed: Mar. 12, 1976

Related U.S. Application Data

[63] Continuation-in-part of Ser. No. 506,761, Sept. 17, 1974, Pat. No. 3,944,530.

[30] Foreign Application Priority Data

Sept. 27, 1973 Japan .............................. 48-107953

[51] Int. Cl.$^2$ .......................................... C08F 210/00
[52] U.S. Cl. ...................... 526/5; 526/159; 526/348; 526/901; 526/916; 264/99
[58] Field of Search ................. 526/348, 5, 901, 916; 264/99

[56] References Cited

U.S. PATENT DOCUMENTS 3,294,885  12/1966  Clines et al. ........................... 264/99
3,736,307  5/1973  Perry ............................... 260/88.2 R Primary Examiner—Joseph I. Schofer
Assistant Examiner—A. L. Clingman
Attorney, Agent, or Firm—Eugene Sabol

[57] ABSTRACT

Articles such as containers made of a highly crystalline olefin polymer having improved transparency and impact strength are obtained by biaxially extending an extruded tubular body of said polymer at an orientation temperature below the melting point thereof to attain an extension magnification ratio of at least 1.5 for each of the longitudinal and lateral directions. The polymer is a statistical random copolymer of propylene and from 1.5% to 5.0%, and preferably from 3.0% to 5.0%, by weight ethylene having a melt index of 0.6 – 3.0 g/10 min. Optionally, from 0.03 to 0.20 part by weight of p-tert. butyl benzoic acid, benzoic acid or sodium benzoate are added to 100 parts by weight of said copolymer.

6 Claims, No Drawings

1

ARTICLE MADE OF PROPYLENE-ETHYLENE COPOLYMER

CROSS REFERENCE TO RELATED APPLICATION

This application is a continuation-in-part of our copending application Ser. No. 506,761 filed Sept. 17, 1974 now U.S. Pat. No. 3,944,530.

BACKGROUND OF THE INVENTION

1. Field of the Invention

The present invention relates to articles such as containers made of a highly crystalline olefin polymer which have improved clarity and impact strength. More particularly, the present invention relates to articles such as containers obtained by the biaxial orientation blow molding of said olefin polymer.

2. Description of the Prior Art

As plastic containers, those made by conventional blow molding techniques from raw materials such as high density polyethylene, low density polyethylene and polyvinyl chloride, have heretofore been prevalent. However, there has recently been extensive interest in obtaining containers made by so-called biaxial orientation blow molding and this technique has been used to some extent with polyvinylidene chloride, polyvinyl chloride, polystyrene, crystalline homopolymers and copolymers of olefins such as polypropylene, etc. Techniques that use polypropylene or copolymers containing a major proportion thereof as raw material have attracted wide interest.

Biaxial orientation blow molding is a forming method wherein orientation is built up in a hollow body by extension in biaxial directions, i.e., longitudinal and lateral directions, so as to improve physical properties. One such method comprises extending a tubular plastic body formed by extrusion molding or injection molding in its longitudinal direction at a temperature within the region of the orientation temperature, and then further extending also in the lateral direction in a metal mold by blowing thereinto a pressurized fluid to shape the body into a desired form and this is known as the successive orientation method. Another method comprises forming a preliminary product by preforming the tubular body at orientation temperature in a metal mold and further blowing a pressurized fluid thereinto in a second metal mold having the desired final configuration, or blowing a pressurized fluid into said second mold while imparting longitudinal extension mechanically to shape into the desired form, and this is known as the simultaneous orientation method. Many methods have been proposed by, for example, Japanese Pat. Nos. 521711 and 662944, Japanese patent publication No. 47-1117, U.S. Pat. Nos. 3,294,885 and 3,244,778, etc. some of which have been used in practical application with various thermoplastic resins as the raw material therefor.

In particular, containers formed by biaxial orientation blow molding of a highly crystalline homopolymer or copolymer of olefins such as polypropylene may be capable of exhibiting highly useful properties for packaging containers due to the great improvements in physical properties such as transparency, rigidity, impact strength and gas impermeability, etc., compared with such containers made by conventional blow molding. However, among these properties, transparency is inferior to that of polyvinyl chloride containers made by conventional blow molding and impact strength is inferior to that of high density polyethylene containers so that further improvement is required even in the biaxially oriented containers. In addition, the range of molding temperatures suitable for heating the extruded tubular parison during the orientation blow molding operation is highly limited, so that a strict control of the heating device is required and therefore a higher technique of operation and excessive installations were necessitated.

In our copending application Ser. No. 506,761 now U.S. Pat. No. 3,944,530, we have disclosed articles obtained by cooling and solidifying an extruded tubular body of a highly crystalline olefin polymer and thereafter extending it biaxially at an orientation temperature below the melting point to attain an extension magnification ratio of at least 1.5 for each of longitudinal and lateral directions, wherein said polymer is a statistical random copolymer of propylene with ethylene having a melt index of 0.6 – 3.0 g/10 min. and an ethylene content of from 0.3% to 5.0% by weight and contains a crystalline nucleating agent selected from aluminum p-tert.-butyl benzoate and sodium p-tert.-butyl benzoate in an amount of from 0.03 to 0.20 part by weight per 100 parts by weight of said statistical random copolymer.

SUMMARY OF THE INVENTION

It is a primary object of the present invention to provide articles such as containers formed from highly crystalline olefin polymers which exhibit improved transparency and impact strength.

It is another object of the present invention to provide such articles formed by biaxial orientation blow molding.

It has been found that the foregoing objects may be attained by using in the formation of such articles, an olefin polymer having definite physical properties or by using a material in which a specially selected nucleating agent is added to said polymer. In addition, in constrast to the above-described circumstances of the prior art, by using the polypropylene prescribed according to the present invention in orientation blow molding, not only is it possible to obtain a molded product having much high clarity and impact strength, but it is also possible to conduct the molding under the same conditions upon changes in the form of the molding product, since the necessity of temperature control has become eased due to the broadened suitable range of molding temperature of said polypropylene. Moreover, a further advantage can be realized by the better dimensional stability upon extrusion of the pipe, such as an increase in the amount of the extrusion output limit.

Description of the Preferred Embodiments

According to the present invention, the two properties of transparency and impact strength are improved from the standpoint of the polymer material used. The first embodiment of the present invention relates to articles such as hollow containers obtained by using a statistical random copolymer of propylene and ethylene having a melt index of from 0.6 to 3.0 g/10 min. and an ethylene content of from 1.5% to 5.0%, and preferably from 3.0% to 5.0%, by weight, cooling and solidifying a tubular body formed by extrusion molding of said copolymer and then extending the body in biaxial direction at an orientation temperature below the melting point in such a manner so as to attain an extension magnification ratio of at least 1.5 in each of the longitudinal and lateral directions. The second embodiment of the present invention is characterized in that a mixture of from 0.03 to 0.20 part by weight of p-tert. butyl benzoic acid, benzoic acid or its sodium salt (sodium benzoate) and 100 parts by weight of the statistical random copolymer of the first embodiment is used as the raw material.

In the past, block or block-random types of propyleneethylene copolymers have been exclusively used for biaxially oriented films in order to increase heat-sealability as well as tear strength, and for injection molded products or the like for the purpose of increasing impact strength and rigidity. However, little or no improvement in transparency has been obtained in either case. Therefore, it is apparent that the improvements in transparency and impact strength, and especially the remarkable increase in transparency obtained according to the present invention, are new and unexpected. While some increase in one or both of said properties, when compared to other blow molded products, can be obtained when such propylene-ethylene copolymers are subjected to conventional blow molding, the increases are not of any significant amount. Noticeable impovements in both properties can be achieved only when these copolymers are employed in the biaxial orientation blow molding of a tubular body formed by extrusion as set forth in the present invention.

The copolymer used according to the present invention is a statistical random copolymer of propylene and ethylene having a melt index (MI) of from 0.6 to 3.0 g/10 min. and an ethylene content of from 1.5% to 5.0% by weight and preferably from 3.0% to 5.0% by weight. If the MI value is lower than 0.6, transparency and also extrudability will be decreased. When the value exceeds 3.0, impact strength decreases and the accuracy of dimensions obtained during extrusion of the tubular body is reduced so that irregularities in wall thickness tend to occur. When the ethylene content is less than 1.5%, little or no improvement in transparency, impact strength or in moldability will be apparent whereas when the etheylene content is above 5.0%, no further increase in transparency over that of 5.0% content can be seen and the obtained article is impracticable as a packaging container because of marked decreases in rigidity and buckling strength. Moreover, since non-crystalline materials such as an atactic polymer and a rubbery substance may be by-produced, treatment of the slurry after the polymerization becomes difficult and, in addition, because most of these noncrystalline materials are dissolved in the solvent, upon separating the slurry into polymer and solvent, they are only difficultly recovered, so that the polymer yield may be decreased and be impractical.

In general, propylene-ethylene copolymers are classified according to their molecular structure into three groups, i.e., statistical random copolymers, block copolymers and block random copolymers. According to the disclosure of the present invention, it has been found that only a statistical random copolymer having an MI of 0.6 – 3.0 g/10 min. and an ethylene content of 1.5% – 5.0% by weight will exhibit the above-described advantages.

The statistical random copolymer herein can be defined as a polymer wherein propylene and ethylene co-exist in a gas mixture in a definite ratio, with or without possible variation either in a continuous manner or periodic manner, during the whole polymerization reaction from the initiation to the termination thereof, or wherin solely propylene is polymerized at the earliest stage of the polymerization and thereafter a gas mixture of propylene and ethylene is fed to complete the copolymerization to obtain a polymer containing less than 10% of propylene homopolymer portion based on the toal weight of the whole polymerization product.

A block copolymer may be defined as a polymer composed of a propylene homopolymer segment and an ethylene homopolymer segment. An example of a process for its production is found in British Pat. No. 889,230.

A block random copolymer may be defined as a polymer in which an ethylene homopolymer segment and a random copolymer portion copolymerized by introducing a propylene/ethylene gas mixture are included with or without a propylene homopolymer segment. An example of a process for the production thereof is found in British Pat. No. 978,893.

In the following, the methods of determination of ethylene content in the various copolymers are explained.

In an IR-absorption spectrum of a propylene-ethylene copolymer, the wave number of the characteristic absorption band appears at the neighborhood of 700 cm$^{-1}$ based on the lateral vibration of the methylene radical —$CH_2$—. Denoting propylene by PL and ethylene by EL, the wave numbers observed according to e.g., G. Bucci et al. in J. Polymer Sci., Part C.1, P 203–212 (1964) are given as follows:

| Monomer Units | Absorption Wave No. | —$(CH_2)_n$— |
|---|---|---|
| -PL-PL-PL- | 815 (cm$^{-1}$) | n = 1 |
| -PL-EL-PL- | 733 | n = 3 |
| -PL-EL-El-PL- | 722 | n = 5 |
| -PL-EL-EL-El- | 720 | n = 7 or more |

Since the statistical random copolymer contains the EL-units in a statistically random distribution, a sharp absorption line appears only at 733 cm$^{-1}$. In case of the block copolymer, since it contains a successively connected EL-chain, a sharp absorption at 720 cm$^{-1}$ and a smaller absorption peak at 733 cm$^{-1}$ due to individual EL-units are observed. In the block random copolymer therefore, both peaks at 720 and 733 cm$^{-1}$ appear. Therefore, settling these absorptions at 720 cm$^{-1}$ and 733 cm$^{-1}$ as the key bands, a calibration curve is prepared by plotting the sum of the integral absorption intensities (areal abosrption) at 720 cm$^{-1}$ and at 733 cm$^{-1}$ against the polyethylene content by measuring the absorption for blended products in which the proportions of polypropylene to polyethylene are predeterminedly varied. From this calibration curve, ethylene content of a propylene-ethylene copolymer can be determined.

The statistical random propylene-ethylene copolymer of the present invention can be produced by polymerization methods such as, for example, a method in which a propylene-ethylene gas mixture containing the desired amount of ethylene is subjected to polymerization under definite conditions, a method in which the mixing ratio of both of the gases is varied either continuously or intermittently during the polymerization, or a method in which the reaction temperature or the reaction pressure is varied so as to control the conversion yield of ethylene. The control of MI can be accomplished by conventional means such as by the use of chain transferring agents, control of reaction temperature, etc.

The molding procedure is not restricted, so long as an extruded tubular body suitable for use with an orientation blow molding metod can be obtained. As to the magnification ratio, an extension of at least 1.5 or more is necessary for each of the longitudinal (axial of the tube) and lateral (radial) directions. The magnification ratio of extension in the lateral direction is expressed by the ratio of the average outer diameter of the blown product to that of the tubular body before extension. This is because of the fact that little or no effect of orientation by extension will be observed at a magnification ratio of below 1.5, and improvements in transparency and impact strength will not be sufficient. The biaxial extension may be of a successive or simultaneous nature. Although the extruded tubular body may be cut into articles either before or after it is extended, it is desirable to quench the tubular body as soon as possible upon solidification by cooling directly after extrusion thereof. The reason for this is that to obtain substantial improvement of transparency of the final product, it is helpful to conduct the solidification while suppressing the growth of spherulites in the intermediate cross-sectional layer of the tubular body wall as much as possible. For this purpose, many measures can be used such as, for example, the use of water circulating through a refrigerator for the cooling water, disposing an air passageway in the central portion of the annular extrusion die in order to jet air and moisture therein for cooling the product in the direction of extrusion, etc.

While the copolymer useful in accordance with the present invention has been known, however, when this copolymer is used for any molding other than that described by the present invention such as, for example, for biaxially oriented film or non-oriented film, substantially no increase in the clarity, impact strength or moldability can be achieved, although an increase in heat-sealability and tearing strength may be recognized. Only by combining with the specific molding method according to the present invention, has it become possible to reach marked improvements in the many aspects as described above.

The p-tert.-butyl benzoic acid, benzoic acid and sodium benzoate used according to the present invention are known as so-called crystallization nucleating agents. However, it has been found that other known crystallization necleating agents, such as sebacic acid, magnesium carbonate and anhydrous thioglycollic acid, etc., do not exhibit any substantial effect for attaining the objects of the present invention. The admixing of the above-described agent with the copolymer can be carried out either by a dry mixing procedure using apparatus such as a Henschell mixer, ribbon blender, etc., in a wet mixing procedure by admixing in the form of an aqueous slurry with subsequent drying, in a direct compounding procedure or in a master batch procedure. However, it is essential to disperse the agent (acid or salt) into the resin mass so as to be substantially homogeneous.

In general, transparency of crystalline olefin polymer products depends primarily upon the physical smoothness of both surfaces, the degree of crystallization in the inner layer, the average crystal size and the homogeneity thereof.

Inspection by a polarizing microscope of the sections of cut pieces from each of two formed products, to one of which was added p-tert. butyl benzoic acid, benzoic acid or sodium benzoate in accordance with the present invention and the other being produced without additive while maintaining the other conditions identical, revealed that the crystals in the central portion of the cut piece of the product without additive had grown substantially and the average crystal size, for example, reached to form about several tens to several hundreds of microns whereas the average crystal size of the product with additive was barely about 10 microns or so and the crystal size distribution was homogeneous. Inspection of the outer surface of each of the products using a phase contrast microscope revealed that in the product without additive a portion of the coarse crystals extended to the surface region so as to decrease surface smoothness, whereas the product with additive was constituted from aggregates of very fine crystals and the outermost layer thereof had been solidified in a substantially amorphous state so that it exhibited an extremely smooth surface. Thus, since the physical smoothness of both the external and internal surfaces is improved and also since in the region of inner layer, the crystal aggregates are homogeneous and of small size and a homogeneous molecular orientation is imparted, an improvement in transparency and, thus, a formed product with especially high transparent visibility can be attained.

In order to further illustrate the present invention in detail, the following examples are presented.

EXAMPLE 1

In a stainless autoclave having an inner volume of 100 liters, 10 liters of heptane, 7 grams of titanium trichloride (product of the Stauffer Chem. Inc., USA, AA-grade) and 20 grams of diethylaluminum monochloride were charged under $N_2$-atmosphere. After the $N_2$ gas in the autoclave had been expelled, hydrogen gas was charged at a partial pressure in the gas phase of 0.2 kg/cm$^2$G and then ethylene was charged until the inner pressure reached 3 kg/cm$^2$G. By heating the autoclave under agitation the temperature was raised to 70° C. A propylene-ethylene gas mixture was introduced therein and the polymerization was commenced while holding the inner pressure at 5 kg/cm$^2$G. During the polymerization, a ratio of ethylene of 4 wt. % was maintaned. After the amount of polymer reached 5 kg, polymerization was stopped by introducing 2000 ml. of butanol with stirring for 30 minutes at 80° C. to decompose the catalyst and the autoclave content (slurry) was then discharged after it was cooled. The slurry was filtered and washed with water repeatedly and then dried under a reduced pressure to obtain a polymer powder. To this, 0.10% by weight of 2,6-di-tert. butyl-p-cresol and 0.20% by weight of calcium stearate was added as a stabilizer and then, after it was mixed in a Henschel mixer for 5 minutes, it was pelletized at 230° C. The MI determined and ethylene content observed were 1.0 g/10 min. and 3.0 wt. % respectively.

Using this polymer, a cylindrical pipe having a wall thickness of 6 mm and an outer diameter of 22 mm was extruded by a 40 mm φ extruder at a temperature of 230° C. and the extruded pipe was cut down to a length of 150 mm. This cut pipe (parison) was heated to a molecular orientation temperature below the melting point thereof and extended in the longitudinal direction to 2.5 times of its original length. The elongated pipe was then placed in split metal molds and, using pressurized air, blown up into the final container shape. The container obtained had an inner volume of 300 ml. and a weight of 20 grams.

COMPARISON EXAMPLE 1

Polymerization was carried out as in Example 1. In this case, however, propylene was introduced up to 3 kg/cm$^2$G after the hydrogen introduction and, while stirring and heating the atuoclave to 70° C., propylene was introduced and the polymerization was commenced while keeping the inner pressure at 5 kg/cm$^2$G. After the amount of polymer reached 2 kg., the introduction of propylene was stopped and the propylene remaining was discharged. N$_2$ gas was introduced up to 1 kg/cm$^2$G and stirred and discharged. After repeating this procedure several times to assure the complete discharge of the remaining propylene, ethylene was introduced until an inner pressure of 1 kg/cm$^2$G was reached and the polymerization was further continued at 70° C. After the amount of ethylene polymerized reached 100 grams, the introduction of ethylene was stopped and the ethylene remaining was discharged and further discharge with N$_2$ gas was carried out.

After the above procedure from the hydrogen introduction to the ethylene removal was repeated once more, the polymerization was complete and powdery polypropylene was obtained by treating by the method described and a container was made in the same manner as described in Example 1.

COMPARISON EXAMPLE 2

The same process as in Comparison Example 1 was followed to produce a container, except that the total amount of ethylene polymerized was raised to 140 grams (two times of 70 grams).

COMPARISON EXAMPLE 3

The same process as in Comparison Example 1 was followed to produce a container, except that a propylene-ethylene gas mixture containing 1% by weight of ethylene was introduced after the hydrogen introduction, the inner pressure of 5 kg/cm$^2$G was kept at 70° C. and after the amount of polymer reached 4 kg., the remaining gas was discharged and, after the further discharge with N$_2$, ethylene was introduced and the polymerization of ethylene was continued under an inner pressure of 1 kg/cm$^2$G until 200 grams of ethylene polymerization was reached.

COMPARISON EXAMPLE 4

The same procedure as in Comparison Example 3 was followed to obtain a container, except that a proplyene-ethylene gas mixture containing 1% by weight of ethylene was polymerized and, after 4 kg. of polymer was obtained, the remaining gas was discharged and thereafter 100 grams of ethylene were further polymerized.

COMPARISON EXAMPLE 5

The same procedure as in Comparison Example 1 was followed to produce a container, except that only propylene was solely polymerized.

For the above 6 containers, haze values (%) were determined. The results are given in the following Table 1.

Table 1

| Example No. | Structure of polymer | MI (g/10 min.) | Ethylene content (wt. %) | Haze (%) |
|---|---|---|---|---|
| Example 1 | Statistical random | 1 | 3 | 8.4 |
| Comparison Example 1 | Block | 1 | 5 | 25.0 |
| Comparison Example 2 | Block | 1 | 3 | 20.3 |
| Comparison Example 3 | Block-random | 1 | 5 | 15.5 |
| Comparison Example 4 | Block-random | 1 | 3 | 15.0 |
| Comparison Example 5 | Homo | 1 | 0 | 15.7 |

From Table 1 it is clearly recognized that clarity is lower in block copolymers than in the homopolymer, that the block random copolymers reveal no increase in clarity compared to the homopolymer and that only a statistical random copolymer exhibits a marked increase in clarity.

EXAMPLE 2

Usng homopolymers and statistical random copolymers having various ethylene contents and different MI, a non-oriented film (CPP) and biaxially oriented film (OPP, extension magnification TD7X MD7), both having a thickness of 25 microns, were produced by a 65 mm $\phi$ extruder. The results of determinations of haze for these products are given in the following Table 2.

Table 2

| Polymer | MI (g/10 min.) | Ethylene content (wt. %) | Molded product | Haze (%) |
|---|---|---|---|---|
| A | 3 | 0 | CPP | 4.2 |
| B | 2 | 0 | CPP | 4.0 |
| C | 2 | 3 | CPP | 3.9 |
| D | 3 | 3 | CPP | 4.0 |
| E | 3 | 0 | OPP | 3.5 |
| F | 2 | 0 | OPP | 3.3 |
| G | 2 | 3 | OPP | 3.0 |
| H | 3 | 3 | OPP | 3.2 |

From the results in Table 2 it is revealed that the statistical random copolymer used according to the present invention, when used for such products as extruded film, injection molded product and the like, does not reveal an increase in clarity.

EXAMPLE 3

This example was carried out for a block copolymer, homopolymer and statistical random copolymer to compare the permissible temperature ranges for heating the parison upon orientation blow molding and the moldabilities expressed by the upper limits of extrusion amounts in a continuous extrusion under the conditions described as follows:

Extruder:
    outer diameter of screw 90 mm$\phi$, L/D = 25,
    compression ratio 3.0
Extruded pipe;
    outer diameter 25 ± 0.5 mm
    inner diameter 15 ± 0.5 mm
    cylindrical shape
Appearance: should be smooth without scar The results are summarized in the following Table 3.

Table 3

| Polymer Structure | MI (g/10 min) | Ethylene Content (wt. %) | Upper limit of extrusion amount (kg/hr) | Heating temperature range (° C.) |
|---|---|---|---|---|
| Block | 2 | 4 | 85 | 168 ± 0.5 |
| Homo | 2 | 0 | 75 | 169 ± 0.5 |
| Statistical random | 2 | 1 | 110 | 156 ± 1.0 |
| Statistical random | 2 | 4 | 120 | 154 ± 2.0 |

In the above Table 3, if the heating temperature range is exceeded to a higher temperature, a nonhomogeneous extension occurs, so that the distribution of wall thickness of the container becomes nonhomogeneous and, if the range is exceeded to the lower side, micro shaping ability for patterns, such as threads, etc., is decreased and welding of the bottom is insufficient or even may not be possible so that a decrease of strength for a container occurs.

From the results of Table 3 it can be seen that a container made according to the present invention using a statistical random copolymer shows higher limiting amounts of extrusion and a wider heating temperature range than do block copolymers or homopolymers.

EXAMPLE 4

In this example, the values for clarity (in haze), impact strength (in drop impact strength) and stiffness (in Young's modulus) for various statistical random copolymers having different MI and ethylene content values were determined and the results are shown in the following Table 4.

Table 4

| | Influence of MI and Ethylene Content | | | |
|---|---|---|---|---|
| MI[1] (g/10 min) | Ethylene[2] content (wt. %) | Haze[3] (%) | Drop impact[4] strength (times) | Young's[5] Modulus (kg/cm²) |
| 0.5 | 3.0 | 12.5 | >20 | 16,500 |
| 1 | 3.0 | 8.4 | >20 | 13,400 |
| 3 | 3.0 | 7.8 | >20 | 14,000 |
| 4 | 3.0 | 9.0 | 17 | 15,300 |
| 1 | 0 | 15.7 | 20 | 16,000 |
| 1 | 1.0 | 12.8 | >20 | 15,100 |
| 1 | 1.5 | 8.5 | >20 | 14,500 |
| 1 | 5.0 | 8.2 | >20 | 12,500 |
| 1 | 6.0 | 8.5 | >20 | 9,800 |
| 0.5 | 0 | 21.2 | 20 | 17,900 |
| 4.0 | 0 | 15.5 | 15 | 15,500 |
| 0.6 | 2.0 | 8.8 | >20 | 15,000 |
| 0.6 | 0.3 | 19.9 | >20 | 15,200 |

Notes on Table 4:
1. According to ASTM-D-1238-62T;
2. Calculated from infrared absorption spectrum;
3. A haze-o-meter model TC-12 from Tokyo Denshoku was used; based on JIS-K-6714; a cut piece from the formed product was used as a sample;
4. Expressed as the repeated number of vertical drops from a height of 120 cm onto a concrete surface until rupture occurred, the container being filled with an aqueous solution of sodium chloride at −5° C. after being dipped in the same solution for 30 minutes;
5. Obtained with an Instron universal tension tester according to ASTM-D-638; calculated from the stress-strain curve.

EXAMPLE 5

Using statistical random propylene-ethylene copolymers having an MI of 1.1 g/10 min. and an ethylene content of 3% by weight in which the nucleating agent of the present invention and amount thereof were different, hollow containers were molded under the conditions described in Example 1. With these containers, transparency (haze) and impact strength (repeated drop test) were determined and the results obtained were as shown in the following Table 5.

Table 5

| Influence of Kind and Amount of Nucleating Agent | | | |
|---|---|---|---|
| Nucleating Agent | | | |
| Sort | Amount (wt. %) | Haze of the formed product (%) | Drop strength (times) |
| Na Benzoate | 0.01 | 10.8 | >20 |
| Na Benzoate | 0.10 | 6.5 | >20 |
| p-tert. butyl Banzoic acid | 0.10 | 7.0 | >20 |
| Benzoic acid | 0.10 | 7.5 | >20 |
| Na Benzoate | 0.10 | 6.8 | >20 |

EXAMPLE 6

Using statistical random propylene-ethylene copolymers having an MI of 1 g/10 min. and an ethylene content of 3% by weight, hollow containers were molded under the conditions described in Example 1. Haze values of the containers to which various nucleating agents including those of the present invention and those of the prior art and of the parent application Ser. No. 506,761 were added are shown in the following Table 6.

Table 6

| Influence of Nucleating Agent | | |
|---|---|---|
| Nucleating Agent | | |
| Sort | Amount (wt. %) | Haze (%) |
| Sebacic acid | 0.10 | 10.7 |
| Thiodiglycolic anhydride | 0.10 | 9.4 |
| Succinic acid | 0.10 | 15.5 |
| Cinnamic acid | 0.10 | 14.0 |
| Adipic acid | 0.10 | 17.8 |
| Benzoic acid | 0.10 | 7.5 |
| Sodium benzoate | 0.10 | 6.8 |
| p-tert. butyl Benzoic acid | 0.10 | 7.0 |
| Sodium p-tert. butyl benzoate | 0.10 | 6.5 |
| Aluminum p-tert. butyl benzoate | 0.10 | 5.9 |
| Aluminum p-tert. butyl benzoate | 0.01 | 8.2 |
| Aluminum p-tert. butyl benzoate | 0.03 | 6.0 |
| Aluminum p-tert. butyl benzoate | 0.20 | 7.0 |
| Aluminum p-tert. butyl benzoate | 0.30 | 6.8 |
| None | — | 8.4 |

As is clear from the foregoing, articles such as containers formed in accordance with the present invention are remarkably excellent in transparency and impact strength and the decrease in rigidity is only slight as compared to the contrast containers.

The transparency is comparable to containers made by conventional blow molding from polyvinyl chloride and the impact strength can also compete with containers made of high density polyethylene by conventional blow molding.

What is claimed is:

1. An article having improved transparency, impact strength and moldability which is obtained by cooling and solidifying an extruded tubular body of a highly crystalline olefin polymer and thereafter extending it biaxially by orientation blow molding at an orientation temperature below the melting point to attain an extension magnification ratio of at least 1.5 for each of longitudinal and lateral directions, wherein said polymer is a statistical random copolymer of propylene with ethylene which has a melt index of from 0.6 to 3.0 g/10 min. and an ethylene content of from 1.5% to 5.0% by weight.

2. The article according to claim 1 wherein said polymer has an ethylene content of from 3.0% to 5.0% by weight.

3. The article according to claim 1 wherein said article is a container.

4. The article according to claim 1 wherein a crystallization nucleating agent selected from the group consisting of benzoic acid, sodium benzoate and p-tert. butyl benzoic acid is added in an amount of from 0.03% to 0.20% by weight of said polymer.

5. The article according to claim 4 wherein said polymer has an ethylene content of from 3.0% to 5.0% by weight.

6. The article according to claim 5 wherein said article is a container.

* * * * *